Nov. 20, 1928. 1,692,395
J. R. THOMAS
COMPRESSOR
Original Filed June 8, 1922
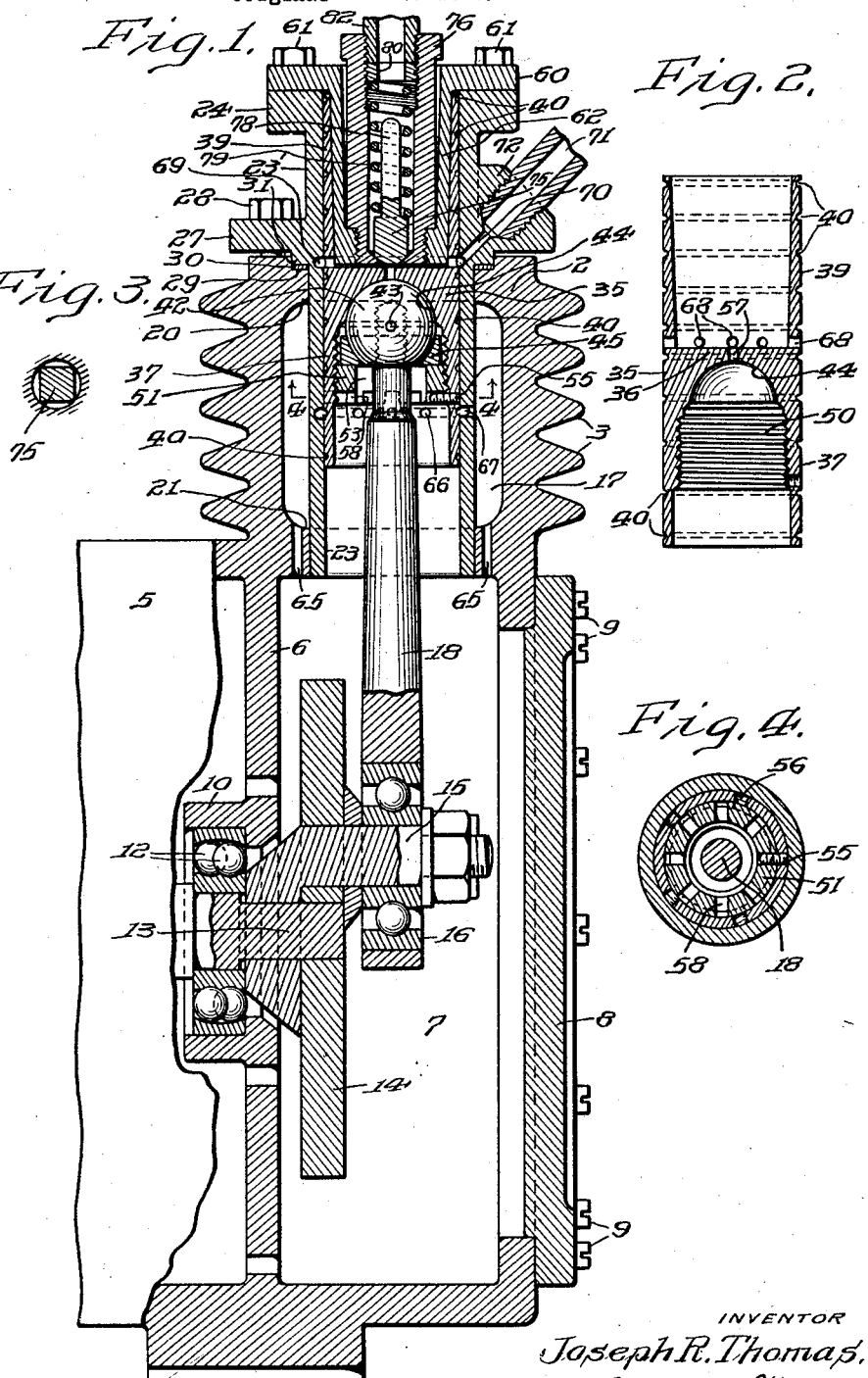
INVENTOR
Joseph R. Thomas.
WITNESS
F. J. Hartman.
ATTORNEYS Patented Nov. 20, 1928.

1,692,395

UNITED STATES PATENT OFFICE.

JOSEPH R. THOMAS, OF PHILADELPHIA, PENNSYLVANIA, ASSIGNOR, BY MESNE ASSIGNMENTS, TO WIDMER COMPRESSOR, INC., OF PHILADELPHIA, PENNSYLVANIA, A CORPORATION OF DELAWARE.

COMPRESSOR.

Application filed June 8, 1922, Serial No. 566,767. Renewed April 13, 1928.

My invention relates to compressors or the like, particularly those intended for effecting compression of the refrigerant in refrigerating units for household and other similar purposes as distinguished from large refrigerating installations employed in commercial refrigeration in the manufacture of artificial ice, and is more especially adapted and intended for use in a compressor of the general type forming the subject of an application for Letters Patent of the United States filed jointly by Arthur D. Shaw and myself on April 14, 1922, Serial No. 552,511, now Patent #1,508,805, Sept. 16, 1924, the invention in some respects constituting an improvement upon the said compressor forming the subject of said application.

It has been found that in these small high speed compressors it is desirable to avoid the use of inlet and exhaust valves, and a principal object of my invention, therefore, is to provide a compressor entirely devoid of such valves and so arranged that the admission and exhaust of the fluid which is being acted upon is effected by and in correspondence with the movement of the piston, as distinguished from the employement of separate inlet and exhaust valves for this purpose.

A further object of my invention is to provide in a compressor, a piston of relatively great length whereby the thrust on the cylinder, induced by the angularity of the connecting rod, is distributed over a large area and its tendency to force the piston from proper alignment neutralized to a great extent.

A still further object of my invention is to provide a relief valve of novel construction whereby any liquid which may collect in the cylinder and on the top of the piston may pass out of the cylinder without causing any damage or, in the alternative, the stoppage of the compressor, either of which effects might otherwise occur upon the accumulation of relatively non-compressible liquid in the cylinder sufficient to completely fill the very slight clearance space between the end thereof and the adjacent portion of the piston when the latter is approaching or at the end of the compression stroke.

My invention also contemplates the provision of novel means for effecting a connection between the upper or wrist pin end of the connecting rod of the compressor and the piston which is actuated thereby, said means being adapted to permit a universal movement of the rod, thus eliminating any tendency to bind which the various parts might otherwise have in case of slight relative disalignment, as well as to afford a very fine adjustment between the piston and the rod whereby any lost motion or play between the parts may be substantially eliminated.

The invention further includes all of the other objects and novel features of construction and arrangement hereinafter more particularly referred to or which will be apparent from the following description of a preferred form of the invention taken in connection with the drawing forming a part hereof.

As hitherto stated, the invention is particularly adapted for use in a compressor of the general type forming the subject of the said application for Letters Patent, Serial No. 552,511, and I have in the accompanying drawing, therefore, shown a preferred form of the invention as applied to one end of such a compressor, but as the latter is fully described and illustrated in said application reference will herein be made only to such parts thereof as are requisite to an adequate comprehension of the present invention.

In the said drawing, Fig. 1 is a vertical central section through a cylinder and certain of the adjacent parts of a compressor embodying my invention, portions of certain of the elements being shown in elevation; Fig. 2 is a central vertical section of the piston removed from the cylinder; Fig. 3 is a fragmentary horizontal section through the relief valve and its adjacent bushing, and Fig. 4 is a horizontal section on line 4—4 in Fig. 1 looking in the direction of the arrows. Like numerals are used to designate the same parts in the several figures.

In the form of the invention illustrated, the cylinder block 2, which may be provided with radiating flanges 3 is formed integrally with a housing 5 which, in turn, may be connected with the field ring of the driving motor as more fully explained in said application Serial No. 552,511. The housing is provided with a partition 6 which forms one end of the crank case 7, the other end of which is initially left open and adapted to be operatively closed by a cover plate 8 held in position by bolts or screws 9. The partition 6 is provided with an inwardly directed annular cup 10 in which is seated a ball bearing, generally designated as 12, which is preferably of a well known self-aligning type and which serves to support the armature shaft 13 of the motor. A fly wheel 14 and crank pin 15 are arranged to rotate with this shaft, the crank pin being arranged to support an annular ball bearing, generally designated as 16, which, in turn, is supported within the lower end of the connecting rod 18, the preferred construction and arrangement of the various parts to which reference has just been made in a rather general manner being fully set forth and described in said application. It will be understood, however, that so far as the purposes of the present invention are concerned, the means whereby the crank pin is connected to and arranged for rotation about the armature shaft so as to impart the requisite motion to the connecting rod may be of any desired form suitable for effecting the intended function.

The cylinder block 2 is internally cored so as to provide a chamber 17 disposed between the upper and lower extremities of the block, an inwardly directed annular flange 20 being arranged at the upper end of the chamber and a substantially similar flange 21 at its lower extremity, the inner annular faces of these flanges being arranged to engage and laterally support a cylinder sleeve 23, the interior of which forms the compression cylinder in which the piston is arranged for reciprocation.

The cylinder sleeve extends upwardly for a suitable distance beyond the extremity of the cylinder block to form a portion 23' which terminates in an outwardly directed flange 24, and is also provided at a suitable point between its upper and lower extremities with an annular, outwardly directed supporting flange 27 which extends over the upper end of the cylinder block and is provided with a plurality of holes for the passage of a corresponding number of cap screws 28 which extend down into suitably threaded holes in the cylinder block and by means of which the supporting flange, and in turn the cylinder sleeve, is secured in operative position thereon. Preferably, the upper inner corner of the flange 20 may be recessed or chamfered as at 29 to provide a seat for a thin gasket 30, and a corresponding annular lug 31 formed in the corner between the under surface of the supporting flange 27 and the exterior of the cylinder sleeve in such manner that when the cap screws 28 are drawn up the gasket will be compressed so as to prevent any leakage from the chamber 17.

The piston preferably employed in my invention and best shown in Fig. 2, is of peculiar construction, comprising a body 35 terminating in a surface 36 forming the head of the piston and extended downwardly in the usual manner to form the piston skirt 37. Integrally formed with and extending upwardly from the body for a distance substantially equal to the distance between the head 36 and the lower end of the skirt 37 is a guide skirt 39 formed of a relatively thin annulus of metal of the same exterior diameter as the piston body and preferably having its inner surface slightly tapered upwardly and outwardly as clearly shown in Fig. 2. The exterior surface of the piston, that is, the exterior surface of the skirt 37 as well as the guide skirt 39, is provided with a plurality of vertically spaced peripheral oil grooves 40 which, in operation, collect and retain a suitable lubricant which is introduced into the crank case and which mixes in finely divided form with the fluid passing into the cylinder prior to compression as hereinafter more fully described, thereby insuring constant and adequate lubrication of the cylinder sleeve wall.

As it is desirable, particularly in view of the relatively high speed at which compressors of this type are ordinarily operated, to insure perfect alignment of the parts and prevent any binding or undue friction between the relatively moving surfaces, I prefer to effect the connection between the connecting rod and the piston in a manner suitable for affording a universal movement to the connecting rod at the upper or wrist pin end, and additionally adapted to secure a very fine adjustment between the connecting rod and the piston so as to eliminate any lost motion between the parts with consequent knocking or pounding when in operation. For this purpose I preferably provide the upper end of the connecting rod with a ball 42 of suitable size which may be secured to the rod in any suitable manner, conveniently by screwing the ball on the threaded end of the rod and securing it in place with a pin 43. The upper part of this ball is adapted to rest against a correspondingly curved, cup-shaped surface 44 formed centrally of the piston beneath the head 36 while the lower portion of the ball is arranged to rest in a cup-shaped annular washer 45 of suitable thickness provided with an opening in its lower face for the passage of the rod, this opening being of considerably greater diameter than the upper end of the rod, this washer, as well as the castellated nut hereinafter referred to, being assembled on the connecting rod prior to the positioning of the ball thereon. Preferably, also, the ball is made of relatively great diameter so as to afford a maximum amount of bearing surface.

Suitable means are provided for holding the cup-shaped washer in engagement with the ball 42 and in turn, the ball in engagement with the cup-shaped surface 44 of the piston, and conveniently for this purpose the interior of the piston beneath said surface is suitably threaded as at 50 and a castellated nut 51, threaded on its exterior in correspondence with the threads in the piston and having a central bore 53 of sufficient size to take care of the angularity of the rod, is screwed into the piston for a sufficient distance to bring the washer 45 up against the ball and the ball against the surface 44. To prevent the nut from backing off after the parts have been suitably adjusted, a small set screw 55 may be inserted into one of a plurality of suitable internally threaded openings 56 disposed at intervals in the piston skirt for a sufficient distance to permit the point of the screw to extend into one of the radial cuts or grooves 58 formed in the lower end of the castellated nut, thus holding the latter securely in adjusted position.

In order to permit a very fine adjustment between the parts, I preferably use a thread of relatively fine pitch and provide the piston skirt with several openings, for example as shown in the drawing, and the nut with a plurality of grooves, for example 8, symmetrically disposed with respect to each other, so that a very slight rotative movement of the nut is sufficient to bring some one of its grooves into registration with some one of the openings in the piston skirt so as to permit the insertion of the set screw; thus the washer may be readily brought to a position to substantially eliminate lost motion between the connecting rod and the piston yet permitting entire freedom of movement between these parts. It will be observed that by reason of the materially greater diameter of the opening in the lower face of the washer and in the nut than the diameter of the connecting rod adjacent thereto, the latter is entirely free to assume any position of angularity induced by the movement of the crank pin without coming into contact either with the nut or with the washer, and further that by reason of the universal movement of which the upper end of the connecting rod is capable with respect to the piston, any slight disalignment between the moving parts is compensated for and taken care of and such friction or binding as might otherwise ensue therefrom is eliminated.

To insure thorough and adequate lubrication of the ball, the piston head may be provided with a small oil hole 57 through which a certain amount of the lubricant which is suspended in the fluid under compression finds its way to the surface of the ball, while additionally the splash from the crank case also passes to the ball through the openings in the washer 45 and in the castellated nut.

The cylinder head by means of which the upper end of the cylinder sleeve is operatively closed comprises an annular flange 60 drilled for the reception of cap screws 61 extending into suitably threaded holes in the flange 24 and by means of which the head may be secured in position thereon and a depending annular flange or plug-like portion 62 which extends down into the sleeve and terminates at a point therein adjacent the surface 36 of the piston head when the piston is at the limit of its upward stroke, the exterior surface of the plug-like portion being spaced from the interior of the cylinder sleeve and preferably tapered inwardly and downwardly in correspondence with the taper of the interior of the piston guide skirt so that the latter on the up-stroke of the piston will enter the space between the interior of the sleeve and the exterior of the head and at the termination of said stroke substantially fill the same.

For permitting the passage of the fluid which is to be compressed from the crank case 7 to the chamber 17 and from thence to the interior of the cylinder sleeve, the flange 21 is provided with a plurality of ports 65 and the cylinder sleeve with a plurality of spaced ports 66 extending from the chamber to an annular groove 67 formed on the interior of the sleeve adjacent the position which the upper surface of the piston head assumes at the lower end of the piston travel, the piston being correspondingly provided with a plurality of spaced ports 68 in the guide skirt 39 and just above the piston head and extending entirely through the skirt, the arrangement being such that when the piston is at the lower end of its travel a free passage is provided for the fluid from the crank case to the interior of the piston guide skirt just above the surface of the piston head.

The exhaust of the compressed fluid from the cylinder is effected through the ports 68 and an annular groove 69 formed in the cylinder sleeve at a point to register with said ports at the upper end of the piston stroke, one or more exhaust passages 70 communicating with this groove and in turn with the exhaust pipe 71 which is conveniently threaded into a lug 72 formed on the exterior of the cylinder sleeve adjacent the flange 27.

Means are also provided for permitting the escape from above the cylinder head of any substantially non-compressible liquid which may gather in the cylinder through condensation or otherwise and which, in the absence of such means, might fill the space above the piston head prior to the registration of ports 68 with the exhaust groove 69 and thus result either in the stoppage of the compressor or damage to the parts thereof. In the preferred embodiment of the invention and as shown the said means comprise a relief valve 75 which is contained in a relief valve bushing 76 positioned in the interior of the cylinder head which is suitably bored out or made hollow for that purpose, the lower end of this bushing being threaded or otherwise secured in the lower end of the head and conveniently extending therethrough to terminate flush with the lower face thereof. This bushing is hollow and contains the relief valve which may be of any suitable form, that shown comprising a head at its lower end and an upwardly extending stem 78, the lower face of the head being cooperative with a seat formed at the lower end of the bushing and adapted to normally close a small port formed at the center of the seat. To provide a suitable clearance between the head and the adjacent bushing, I prefer to form the head so as to present a square, horizontal section of such size that the corners will engage the wall of the bushing to guide the head therein as best shown in Fig. 3, while the flat faces of the head are spaced therefrom.

Means are provided for normally holding the valve in position to close this port, said means conveniently comprising a spring 79 coiled about the stem 78 and compressed between an annular adjusting nut 80 threaded into the upper end of the bushing and a shoulder formed on the upper end of the head. It will be understood that this spring is normally adjusted so as to exert sufficient pressure on the valve to hold it on its seat in opposition to the normal maximum pressure developed in the cylinder, but that if from an accumulation of liquid within the cylinder or from any other cause the pressure therein should rise unduly the valve will be lifted from its seat against the force of the spring and the excess pressure relieved. If desired a pipe 82 may be threaded into the upper end of the bushing and connected to the exhaust pipe so as to equalize the pressure above the relief valve and within the cylinder.

It is thought that the operation of the device, the various parts having been constructed and assembled substantially as described, will be readily comprehended without extended description, it being sufficient to say that the fluid which is to be compressed passes from the crank case 7 through the chamber 17 and into the space above the piston head through the ports 68 when the latter come into registration with the groove, 67, after which the initial upward movement of the piston carries the ports out of alignment with the groove and prevents the further entrance of fluid. The continuing upstroke of the piston then effects the compression of the fluid until the ports 68 come into registration with the exhaust groove 69 to thereby permit the compressed fluid to escape through the passage or passages 70 communicating with the exhaust pipe, the relief valve 75 under these conditions remaining continuously closed. In case, however, of an accumulation of liquid above the piston head sufficient in quantity to entirely fill the cylinder as the piston approaches the end of its stroke but before the registration of the ports with the exhaust groove, the relief valve will open to permit the escape of a sufficient quantity of the liquid to prevent stoppage of the compressor or damage to the parts.

While I have particularly referred to and illustrated my invention in an embodiment suitable for use in a compressor of the general type disclosed in said application Serial No. 552,511, I do not thereby desire or intend to specifically limit the use of the invention to compressors of that type as it is applicable to other forms of compressors as well as to pumps and other forms of machinery, nor do I desire to confine myself solely to the precise construction and arrangement of parts herein described as the same may be readily modified in various particulars without departing from the spirit and scope of the invention as defined in the appended claims.

Having thus described my invention, I claim and desire to protect by Letters Patent of the United States:

1. In a compressor, the combination of an internally cored cylinder block, a cylinder sleeve having a plurality of ports communicating with the cored space within the block, and a groove in its inner wall spaced above said ports and forming an exhaust port, means for rigidly securing the sleeve within the block, a cylinder head having a portion extending into the sleeve, and a piston slidable in the sleeve and having a guide skirt adapted to enter the space between the head and the sleeve said skirt being provided with a plurality of ports positioned to register with said first mentionel ports when the piston is at the extremity of its travel in one direction and with said groove when the piston is at the end of its travel in the other direction.

2. In a compressor, the combination of a cylinder block having an internal chamber, a cylinder sleeve disposed in the block and extending beyond the end thereof, said sleeve being provided with a plurality of inlet ports communicating with said chamber and a groove in its inner wall and spaced from said ports, a cylinder head adapted to close an end of the sleeve and having a portion extending into the sleeve and spaced therefrom, and a piston slidable in said sleeve and having a guide skirt projecting beyond its head and adapted to enter the space between the cylinder head and the sleeve and a plurality of ports in said skirt operative to register with said first mentioned ports when the piston is at the limit of its movement in one direction and to register with said groove when the piston is at the limit of its movement in the other direction.

3. In a compressor, the combination of a cylinder block having an internally cored space and ports extending into said space, a cylinder sleeve operatively secured in said block and extending through said space and beyond one end of said block, said sleeve being provided with a plurality of inlet ports communicating with said space and extending through its wall and a groove in its wall spaced from said ports and forming an exhaust passage, a cylinder head adapted to close one end of said sleeve and having a portion extending into the sleeve and spaced from the wall thereof, a piston having a head and skirts extending in opposite directions therefrom, one of said skirts being adapted to enter the space between the head and the sleeve and substantially fill the same when the piston is at one end of its stroke, said skirt being provided with a plurality of ports adapted to register with said first mentioned ports when said piston is at the opposite end of its stroke and to register with said groove when it is at said first mentioned end.

In witness whereof, I have hereunto set my hand this 7th day of June, 1922.

JOSEPH R. THOMAS.